(12) United States Patent
Wolinsky et al.

(10) Patent No.: US 7,613,630 B2
(45) Date of Patent: Nov. 3, 2009

(54) SYSTEM AND METHOD FOR EDITING EXISTING FOOTAGE TO GENERATE AND DISTRIBUTE ADVERTISING CONTENT TO RETAIL LOCATIONS

(75) Inventors: Robert I. Wolinsky, Fairfield, CT (US); Peter G. Goldring, Allendale, NJ (US); Martin A. Amadio, Glen Rock, NJ (US); Stanley Kirshenbaum, Great Neck, NY (US)

(73) Assignee: Automated Media Services, Inc., Allendale, NJ (US)

( * ) Notice: Subject to any disclaimer, the term of this patent is extended or adjusted under 35 U.S.C. 154(b) by 468 days.

(21) Appl. No.: 10/866,517

(22) Filed: Jun. 12, 2004

(65) Prior Publication Data

US 2005/0060362 A1 Mar. 17, 2005

Related U.S. Application Data

(63) Continuation-in-part of application No. 10/277,218, filed on Oct. 17, 2002.

(60) Provisional application No. 60/478,574, filed on Jun. 12, 2003.

(51) Int. Cl.
*G06Q 30/00* (2006.01)

(52) U.S. Cl. .............................. 705/14; 705/1; 705/26; 705/27; 705/37; 725/14; 725/36; 725/42; 725/110; 345/790; 348/584; 375/240.01

(58) Field of Classification Search .................. 705/14, 705/26, 37, 1, 27; 725/14, 32, 36, 110, 42; 348/584; 375/240.01; 345/790
See application file for complete search history.

(56) References Cited

U.S. PATENT DOCUMENTS

| | | | |
|---|---|---|---|
| 2,626,301 A | 1/1953 | Hammerly | |
| 2,969,438 A | 1/1961 | Hermann et al. | |
| 3,159,937 A | 12/1964 | Barnes | |
| 3,210,716 A | 10/1965 | Meacham | |
| 3,504,172 A | 3/1970 | Liberman | |
| 3,680,030 A | 7/1972 | Johnson | |

(Continued)

FOREIGN PATENT DOCUMENTS

BE 1011839 2/2000

(Continued)

OTHER PUBLICATIONS

"Welcome to Digital Display Corporation", Digital Display Corp Home Page, Info printed May 22, 2002.

(Continued)

*Primary Examiner*—Yogesh C Garg
(74) *Attorney, Agent, or Firm*—Sonnenschein Nath & Rosenthal LLP

(57) ABSTRACT

A system and method for displaying content at a business establishment. The system includes a local network in communication with a content delivery system. The local network includes an electronic device, a communication channel, and one or more electronic displays located in relation to one or more products being sold by the business establishment. The electronic device is operable to distribute content derived from existing footage received from the content delivery system in accordance with a playlist identifying the content to be displayed at the business establishment.

14 Claims, 2 Drawing Sheets

U.S. PATENT DOCUMENTS

| | | | |
|---|---|---|---|
| 4,245,874 A | 1/1981 | Bishop | |
| 4,472,707 A | 9/1984 | Wilensky et al. | |
| 4,489,995 A | 12/1984 | Barr | |
| 4,747,025 A | 5/1988 | Barton | |
| 4,887,401 A | 12/1989 | Gioscia | |
| 4,891,922 A | 1/1990 | Hozer et al. | |
| 4,907,137 A | 3/1990 | Schladitz et al. | |
| 4,916,731 A | 4/1990 | Brisson et al. | |
| 4,961,533 A | 10/1990 | Teller et al. | |
| 5,061,997 A | 10/1991 | Rea et al. | |
| 5,070,666 A | 12/1991 | Looman | |
| 5,172,314 A | 12/1992 | Poland et al. | |
| 5,241,467 A | 8/1993 | Failing et al. | |
| 5,245,534 A | 9/1993 | Waterhouse et al. | |
| 5,309,174 A | 5/1994 | Minkus | |
| 5,321,579 A | 6/1994 | Brown et al. | |
| 5,348,485 A | 9/1994 | Briechle et al. | |
| 5,374,815 A | 12/1994 | Waterhouse et al. | |
| 5,412,416 A * | 5/1995 | Nemirofsky | 725/36 |
| 5,418,328 A | 5/1995 | Nadeau et al. | |
| 5,420,606 A | 5/1995 | Begum et al. | |
| 5,448,226 A | 9/1995 | Failing, Jr. et al. | |
| 5,461,561 A | 10/1995 | Ackerman et al. | |
| 5,467,474 A | 11/1995 | Ackerman et al. | |
| 5,473,832 A | 12/1995 | Briechle et al. | |
| 5,532,465 A | 7/1996 | Waterhouse et al. | |
| 5,543,856 A | 8/1996 | Rosser et al. | |
| 5,553,412 A | 9/1996 | Briechle et al. | |
| 5,566,353 A * | 10/1996 | Cho et al. | 725/14 |
| 5,572,653 A | 11/1996 | DeTemple et al. | |
| 5,583,487 A | 12/1996 | Ackerman et al. | |
| 5,632,010 A | 5/1997 | Briechle et al. | |
| 5,636,750 A | 6/1997 | Heyl | |
| 5,642,484 A | 6/1997 | Harrison, III et al. | |
| 5,652,845 A | 7/1997 | Arai et al. | |
| 5,670,743 A | 9/1997 | Welch et al. | |
| 5,673,037 A | 9/1997 | Cesar et al. | |
| 5,687,499 A | 11/1997 | Brnjac et al. | |
| 5,703,564 A | 12/1997 | Begum et al. | |
| 5,704,049 A | 12/1997 | Briechle | |
| 5,734,823 A | 3/1998 | Saigh et al. | |
| 5,736,967 A | 4/1998 | Kayser et al. | |
| 5,739,809 A | 4/1998 | McLaughlin et al. | |
| 5,758,064 A | 5/1998 | Zimmerman et al. | |
| 5,761,601 A | 6/1998 | Nemirofsky et al. | |
| 5,797,132 A | 8/1998 | Altwasser | |
| 5,812,985 A | 9/1998 | Failing et al. | |
| 5,818,346 A | 10/1998 | Goodwin, III et al. | |
| 5,864,325 A | 1/1999 | Briechle et al. | |
| 5,887,147 A | 3/1999 | Arai et al. | |
| 5,930,771 A | 7/1999 | Stapp | |
| 5,955,710 A | 9/1999 | DiFranza | |
| 5,963,133 A | 10/1999 | Monjo | |
| 5,977,998 A | 11/1999 | Briechle et al. | |
| 5,983,069 A | 11/1999 | Cho et al. | |
| 6,016,481 A | 1/2000 | Failing, Jr. et al. | |
| 6,038,545 A | 3/2000 | Mandeberg et al. | |
| 6,038,594 A | 3/2000 | Puente et al. | |
| 6,046,682 A | 4/2000 | Zimmerman et al. | |
| 6,060,993 A | 5/2000 | Cohen | |
| 6,075,576 A | 6/2000 | Tan et al. | |
| 6,076,071 A | 6/2000 | Freeny, Jr. | |
| 6,082,500 A | 7/2000 | Amo et al. | |
| 6,107,936 A | 8/2000 | Zimmerman | |
| 6,108,042 A | 8/2000 | Adams et al. | |
| 6,108,367 A | 8/2000 | Herman et al. | |
| 6,108,637 A | 8/2000 | Blumenau | |
| 6,112,232 A | 8/2000 | Shahar et al. | |
| 6,130,603 A | 10/2000 | Briechle | |
| 6,142,322 A | 11/2000 | Smith et al. | |
| 6,144,944 A | 11/2000 | Kurtzman, II et al. | |
| 6,146,158 A | 11/2000 | Peratoner et al. | |
| 6,160,477 A | 12/2000 | Sandelman et al. | |
| 6,173,317 B1 | 1/2001 | Chaddha et al. | |
| 6,181,299 B1 | 1/2001 | Frederick et al. | |
| 6,199,705 B1 | 3/2001 | Portner | |
| 6,202,334 B1 | 3/2001 | Reynolds et al. | |
| 6,208,977 B1 | 3/2001 | Hernandez et al. | |
| 6,215,411 B1 | 4/2001 | Gothard | |
| 6,233,536 B1 | 5/2001 | Zale et al. | |
| 6,236,330 B1 | 5/2001 | Cohen | |
| 6,236,335 B1 | 5/2001 | Goodwin, III | |
| 6,247,090 B1 | 6/2001 | Arai et al. | |
| 6,263,440 B1 | 7/2001 | Pruett et al. | |
| 6,279,278 B1 | 8/2001 | Morris et al. | |
| 6,288,688 B1 | 9/2001 | Hughes et al. | |
| 6,292,827 B1 | 9/2001 | Raz | |
| 6,300,980 B1 | 10/2001 | McGraw et al. | |
| 6,311,308 B1 | 10/2001 | Adamec | |
| 6,330,976 B1 | 12/2001 | Dymetman et al. | |
| 6,340,958 B1 | 1/2002 | Cantu et al. | |
| 6,366,914 B1 | 4/2002 | Stern | |
| 6,377,938 B1 | 4/2002 | Block et al. | |
| 6,381,626 B1 | 4/2002 | De Leo et al. | |
| 6,384,736 B1 | 5/2002 | Gothard | |
| 6,408,278 B1 | 6/2002 | Carney et al. | |
| 6,424,998 B2 | 7/2002 | Hunter | |
| 6,438,368 B1 * | 8/2002 | Phillips et al. | 455/403 |
| 6,438,882 B1 | 8/2002 | Reynolds | |
| 6,502,076 B1 * | 12/2002 | Smith | 705/14 |
| 6,535,119 B1 | 3/2003 | Haulk et al. | |
| 6,539,429 B2 | 3/2003 | Rakavy et al. | |
| 6,570,492 B1 | 5/2003 | Peratoner | |
| 6,594,311 B1 * | 7/2003 | Pearlstein | 375/240.01 |
| 6,648,153 B2 | 11/2003 | Holmes | |
| 6,662,483 B2 | 12/2003 | Reynolds | |
| 6,715,676 B1 | 4/2004 | Janning | |
| 6,716,042 B2 | 4/2004 | Lin et al. | |
| 6,725,460 B1 * | 4/2004 | Nishiyama et al. | 725/32 |
| 6,748,710 B2 | 6/2004 | Gresham et al. | |
| 6,749,116 B2 | 6/2004 | Massaro | |
| 6,774,812 B2 | 8/2004 | Tada | |
| 6,829,854 B2 | 12/2004 | Reynolds | |
| 6,892,650 B2 | 5/2005 | Baloga et al. | |
| 6,988,667 B2 | 1/2006 | Stewart et al. | |
| 7,066,435 B2 | 6/2006 | Oddsen, Jr. et al. | |
| 7,080,028 B2 | 7/2006 | Goodwin, III et al. | |
| 7,084,765 B2 | 8/2006 | Clapper | |
| 7,098,870 B2 * | 8/2006 | Wampler et al. | 345/2.1 |
| 7,136,906 B2 | 11/2006 | Giacalone, Jr. | |
| 7,155,663 B2 * | 12/2006 | Landsman et al. | 715/500 |
| 7,175,034 B2 | 2/2007 | Nook et al. | |
| 7,193,504 B2 | 3/2007 | Carrender et al. | |
| 7,228,341 B2 | 6/2007 | Giacalone, Jr. | |
| 7,262,686 B2 | 8/2007 | Stewart et al. | |
| 2001/0003846 A1 | 6/2001 | Rowe et al. | |
| 2001/0014876 A1 * | 8/2001 | Miyashita | 705/37 |
| 2001/0020343 A1 | 9/2001 | Reynolds | |
| 2001/0052000 A1 | 12/2001 | Giacalone, Jr. | |
| 2002/0023274 A1 | 2/2002 | Giacalone, Jr. | |
| 2002/0059743 A1 | 5/2002 | Reynolds | |
| 2002/0073588 A1 | 6/2002 | Reynolds et al. | |
| 2002/0087401 A1 | 7/2002 | Leapman et al. | |
| 2002/0104246 A1 | 8/2002 | Reynolds | |
| 2002/0108330 A1 | 8/2002 | Yu et al. | |
| 2002/0109729 A1 * | 8/2002 | Dutta | 345/790 |
| 2002/0111866 A1 | 8/2002 | Carney et al. | |
| 2002/0120518 A1 | 8/2002 | Carney et al. | |
| 2002/0147987 A1 * | 10/2002 | Reynolds et al. | 725/110 |
| 2002/0178445 A1 | 11/2002 | Eldering et al. | |
| 2002/0190972 A1 | 12/2002 | Ven de Van | |
| 2002/0196126 A1 | 12/2002 | Eisenberg et al. | |
| 2003/0051415 A1 | 3/2003 | Remelts et al. | |
| 2003/0055725 A1 | 3/2003 | Lee | |

| | | | |
|---|---|---|---|
| 2003/0079391 | A1 | 5/2003 | Reynolds et al. |
| 2003/0095784 | A1* | 5/2003 | Gordon ........................ 386/46 |
| 2003/0115096 | A1 | 6/2003 | Reynolds et al. |
| 2003/0206632 | A1* | 11/2003 | Itoh et al. ................... 380/231 |
| 2004/0019497 | A1* | 1/2004 | Volk et al. ..................... 705/1 |
| 2004/0035037 | A1 | 2/2004 | Reynolds |
| 2004/0060218 | A1 | 4/2004 | Reynolds et al. |
| 2004/0073484 | A1 | 4/2004 | Camporeale et al. |
| 2004/0116183 | A1* | 6/2004 | Prindle ........................ 463/42 |
| 2004/0158865 | A1 | 8/2004 | Kubler et al. |
| 2005/0060745 | A1* | 3/2005 | Riedl et al. ................... 725/42 |
| 2005/0171843 | A1 | 8/2005 | Brazell et al. |
| 2005/0216339 | A1 | 9/2005 | Brazell et al. |
| 2006/0085262 | A1 | 4/2006 | Brazell et al. |
| 2006/0101521 | A1* | 5/2006 | Rabinovitch ................. 726/26 |
| 2006/0149631 | A1 | 7/2006 | Brazell et al. |
| 2007/0130023 | A1 | 6/2007 | Wolinsky et al. |

FOREIGN PATENT DOCUMENTS

| | | |
|---|---|---|
| EP | 0978814 | 9/2000 |
| EP | 1152614 A2 | 11/2001 |
| FR | 2639410 | 5/1990 |
| FR | 26939410 | 5/1990 |
| FR | 2765018 | 12/1998 |
| JP | 2003050947 * | 2/2003 |
| TW | 408540 | 11/2000 |
| TW | 412687 | 11/2000 |
| TW | 453087 | 1/2001 |
| WO | WO-01/48581 | 7/2001 |
| WO | WO-2005/050988 A1 | 6/2005 |
| WO | WO-2005/107116 A2 | 11/2005 |

OTHER PUBLICATIONS

"Transcript—Case & Levin", www.pathfinder.com/time/transcript/case-levin/pf.html, Feb. 7, 2000.
Market Leader Media, Nov. 13, 1998.
Media SideStreet Corporation, Jun. 13, 2001.
"A Captive View," The Delaney Report, Mar. 2001.
"A Truly New Advertising Medium . . . ," Distributed Media Corporation, Jan. 23, 2001.
"Attention Wal-Mart Shoppers" Forbest Magazine, Apr. 16, 2001.
"Broadband has arrived . . . In a Big Way" DirecWay by Hughes Network Systems, Inc., © 2002.
"Turn Browsers Into Buyers", i-Open Solution, Info printed May 22, 2002.
"Can Retail Be Media?", Pivot Points, Summer 2001.
"CyberStar, a Loral Company", Info printed May 22, 2002 (print date).
"Dancast™: The most exciting new advertising medium in a generation?" © 2001.
"Digital Media", IBM Corporation, © 2001.
"Digital Promotions Make Quick Point McDonald's Testing New Technology on its Menus", The Chicago Tribune Archives, Dec. 26, 1997.
"Digital Signage System", ICS Technology Inc., Info printed May 22, 2002.
"Eddie Bauer's Windows Add Electrinics in New Customised Mark" www.financialexpress.com/fe/daily/200011129/efe29023.html, Nov. 29, 2000.
"EPOP—The Extraordinary Promotional Medium", Toppan Printing Company America, Inc., Info printed May 22, 2002.
"EPOP—The Extraordinary Promotional Medium," Toppan Printing Company America, Inc., Jun. 29, 2001.
"Getting Noticed", S&VC, May 1999.
"Immeon/A New Broadband Concept", © 2002.
"Info Touch Technologies", May 8, 2002.
"InfoChannel 3", Scala Broadcast Multimedia, Mar. 2002.
"In-Store Marketing/advertising solution for Retail", IBM—Digitalmedia Distributor, Dec. 11, 2000.
"Introducing an Integrated Media Company," Broadband Broadcasting Network, Inc., 1997-1999.
"Is it Prime Time at the Mall? New innovators undeterred by past mall TV flops" ISCS Publications, Oct. 2002.
"Jasmine 2000", Fujitsu Limited © 2001.
"Managing the Message", Dynamics Sign Display, Info printed May 22, 2002.
"m-cast", Fujitsu Australia Software Technology 2001-2002.
"Media", Digital View, 2002.
"NCR DecisionNet™ Elecronic Shelf Labels", NCR Corporation, © 2002.
"Out of Home Video", OOH Video Systems Ltd. © 2001.
"Plasma In Demand" P-O-P & In-Store Marketing, www.SalesAndMarketingMag.com, Oct. 2001.
"Plasma Video Screens Prove Customer Hit in Eddie Bauer Test" In-Store Technology, Feb. 2001.
"POPvideo Player" Maintenance-Free Video Advertising by Visual Circuits www.vcircuits.com; Dec. 31, 1998.
"Putting the Snap! Into POP" Creative Marketing Magazine, 1998.
"Remarkable Market Facts About Retail Sign Costs", Gyricon, May 17, 2001.
"Scala—Solutions, Multimedia Messaging to Targeted Audiences", Scala Broadcast Multimedia, Info printed May 22, 2002.
"Store-Specific Marketing—Promotion Optimization Using Digital Signage", i-Open Solutions, No print date available (most likely printed May 22, 2002).
"Technology Uses "Sight & Sound" to Grab Customers at the Point of Purchase", Point-of-Purchase Magazine, Apr. 2000.
"Video Wall Technology", Easy Systems SA Belgium, © 2001.
"VideoworX™ POS Screen", Digital Matter Corporation, Info printed May 22, 2002.
"What is a Digital Sign?", Tzero, Dec. 31, 1999.
"What is adPOS?", adPOS, Info printed May 22, 2002.
Cap ventures—Narrowcasting in Public Spaces-The Outlook For Digital Signage, Sep. 24, 2001.
Forbes.com, "Unplugged" Nov. 25, 2002 (Post filing).
Imagicast, 2000.
i-Open Presentation, Jan. 24, 2001.
SignCast, Jan. 17, 2000.
The Sidecast Network, Feb. 23, 1999.
Transvision, Oct. 28, 2001 (launch network).
Video Billboard, www.futureproof.com/Video%20Bill%20Board.html, Oct. 2000.
"BuyMedia.com Unveils Personalization Enhancements to Web-based Media Buying Service", Business Wire, Nov. 11, 1999.
M.E. Podmolik, "Optimism reigns at online bazaar; Growing pack of services tout savings and efficiency of ad orders"; Advertising Age, vol. 71, Jul. 31, 2000.
Execs: GM may buy TV ad time via Net', Media Electronic, vol. 74, Mar. 13, 2000.
"Services", MyDataVault, © 2002.
"Is Promotion a Dirty Word?", PROMO, Mar. 1, 2001.
"Trade Promotion: Going for Broke", Promo, Aug. 1, 2001.
"Marketing Waste is a Big Problem—a Survey of Marketing Performance Management", Reveries.com, Apr. 2, 2001.
"Chrysler Drives Away From Focus on TV", The Wall Street Journal, May 31, 2001.
International Search Report, PCT/US02/33391, dated Sep. 3, 2003.
Non-Final Office Action dated Dec. 2, 2005 for U.S. Appl. No. 10/277,218.
Response filed May 2, 2006 to Non-Final Office Action dated Dec. 2, 2005 for U.S. Appl. No. 10/277,218.
Final Office Action dated Jul. 31, 2006 for U.S. Appl. No. 10/277,218.
Notice of Abandonment dated Mar. 8, 2007 for U.S. Appl. No. 10/277,218.
Non-Final Office Action dated Nov. 14, 2007 for U.S. Appl. No. 11/600,498.
Response filed May 14, 2008 to Non-Final Office Action dated Nov. 14, 2007 for U.S. Appl. No. 11/600,498.
Final Office Action dated Aug. 20, 2008 for U.S. Appl. No. 11/600,498.
RCE/Response filed Nov. 20, 2008 to Final Office Action dated Aug. 20, 2008 for U.S. Appl. No. 11/600,498.

Restriction Requirement dated Feb. 19, 2009 for U.S. Appl. No. 11/600,498.
Restriction Requirement dated Oct. 22, 2008 for U.S. Appl. No. 10/265,512.
Response filed Nov. 20, 2008 to Restriction Requirement dated Oct. 22, 2008 for U.S. Appl. No. 10/265,512.
Non-Final Office Action dated Feb. 2, 2009 for U.S. Appl. No. 10/265,512.
Interview Summary dated Apr. 27, 2009 for U.S. Appl. No. 10/265,512.
Non-Final Office Action dated Apr. 6, 2007 for U.S. Appl. No. 11/600,635.
Response filed Aug. 2, 2007 to Non-Final Office Action dated Apr. 6, 2007 for U.S. Appl. No. 11/600,635.
Final Office Action dated Nov. 2, 2007 for U.S. Appl. No. 11/600,635.
RCE/Response filed May 2, 2008 to Final Office Action dated Nov. 2, 2007 for U.S. Appl. No. 11/600,635.
Non-Final Office Action dated Aug. 20, 2008 for U.S. Appl. No. 11/600,635.
Response filed Nov. 20, 2008 to Non-Final Office Action dated Aug. 20, 2008 for U.S. Appl. No. 11/600,635.
Final Office Action dated Feb. 3, 2009 for U.S. Appl. No. 11/600,635.
Response filed Apr. 10, 2009 to Final Office Action dated Feb. 3, 2009 for U.S. Appl. No. 11/600,635.
Advisory Action dated Apr. 17, 2009 for U.S. Appl. No. 11/600,635.
Non-Final Office Action dated Mar. 21, 2006 for U.S. Appl. No. 10/760,802.
Response filed Apr. 18, 2006 to Non-Final Office Action dated Mar. 21, 2006 for U.S. Appl. No. 10/760,802.
Non-Final Office Action dated May 16, 2006 for U.S. Appl. No. 10/760,802.
Notice of Abandonment dated Apr. 5, 2007 for U.S. Appl. No. 10/760,802.
Non-Final Office Action dated Jun. 28, 2005 for U.S. Appl. No. 10/893,757.
Response filed Nov. 28, 2005 to Non-Final Office Action dated Jun. 28, 2005 for U.S. Appl. No. 10/893,757.
Non-Final Office Action dated Feb. 9, 2006 for U.S. Appl. No. 10/893,757.
Notice of Abandonment dated Sep. 7, 2006 for U.S. Appl. No. 10/893,757.
Restriction Requirement dated Dec. 19, 2008 for U.S. Appl. No. 10/866,533.
Response filed Dec. 31, 2008 to Restriction Requirement dated Dec. 19, 2008 for U.S. Appl. No. 10/866,533.
Restriction Requirement dated Feb. 26, 2009 for U.S. Appl. No. 10/866,533.
Response filed Mar. 25, 2009 to Restriction Requirement dated Feb. 26, 2009 for U.S. Appl. No. 10/866,533.
Response filed May 13, 2009 to Non-Final Office Action for U.S. Appl. No. 10/265,512.
WSN—Women's Supermarket Network, Feb. 27, 2001.
International Search Report and Written Opinion mailed May 5, 2009; PCT International Application No. PCT/US09/33595.

* cited by examiner

SYSTEM AND METHOD FOR EDITING EXISTING FOOTAGE TO GENERATE AND DISTRIBUTE ADVERTISING CONTENT TO RETAIL LOCATIONS

CROSS REFERENCE TO RELATED APPLICATIONS

This application claims priority from U.S. Provisional Patent Application Ser. No. 60/478,574 filed Jun. 12, 2003, the entire teachings of which are herein incorporated by reference. This application is also a continuation-in-part of co-pending U.S. patent application Ser. No. 10/277,218 filed Oct. 17, 2002, the entire teachings of which are herein incorporated by reference.

BACKGROUND OF THE INVENTION

1. Field of the Invention

The principles of the present invention are generally related to producing advertising content, and more specifically, but not by way of limitation, to editing existing footage to produce advertising content for distribution and display at a retail location in association with products and/or services being offered for sale.

2. Description of Related Art

Advertising at business establishments, such as retail stores, grocery stores, gas stations, etc. has traditionally been in the form of promotional fliers, cards, coupons, point-of-purchase displays, signs, etc. The promotional materials are generally printed by the marketer and posted at the business establishments by the business establishment to notify customers of products being offered for sale at the business establishments. However, the printed materials are expensive to produce and are often times discarded or simply not posted by the business establishments. For the marketer, it is costly in terms of the printing costs and mailing of the promotional materials, not to mention the loss of sales of the product, if the materials are not used. For the business establishments, it is expensive to receive and post the volume of promotional materials sent by the marketers.

More recent developments in technology include the use of televisions and/or monitors to play promotional videos within business establishments. While the use of video is less wasteful in terms of ensuring display by the business establishment, the production costs to produce the videos can be excessive, even for very short videos (e.g., ten to thirty seconds). Therefore, there is a need to be able to produce inexpensive video advertisements that can capture and hold the attention of a customer of a business establishment.

SUMMARY

To overcome the problem of having to produce low cost, short video advertisements that are capable of capturing and holding the attention of a customer at a business establishment, the principles of the present invention provide for editing existing footage to produce content to be displayed at retail establishments. By using existing footage, production costs of the short video are generally limited to editing fees and possibly copyright licensing fees. Because the existing footage may be selected from popular content, such as a famous movie, television program, sporting event, person, news event, etc., a customer is more likely to be drawn to and maintain his or her attention on the advertisement because of familiarity with the content, thereby spending more money on the products being advertised by or near the electronic display.

One embodiment according to the principles of the present invention include a system and method for displaying content at a business establishment. The system includes a local network in communication with a content delivery system. The local network includes an electronic device, a communication channel, and one or more electronic displays located in relation to one or more products being sold by the business establishment. The electronic device is operable to distribute content derived from existing footage received from the content delivery system in accordance with a playlist identifying the content to be displayed at the business establishment.

DETAILED DESCRIPTION OF THE DRAWINGS

Figure 1:
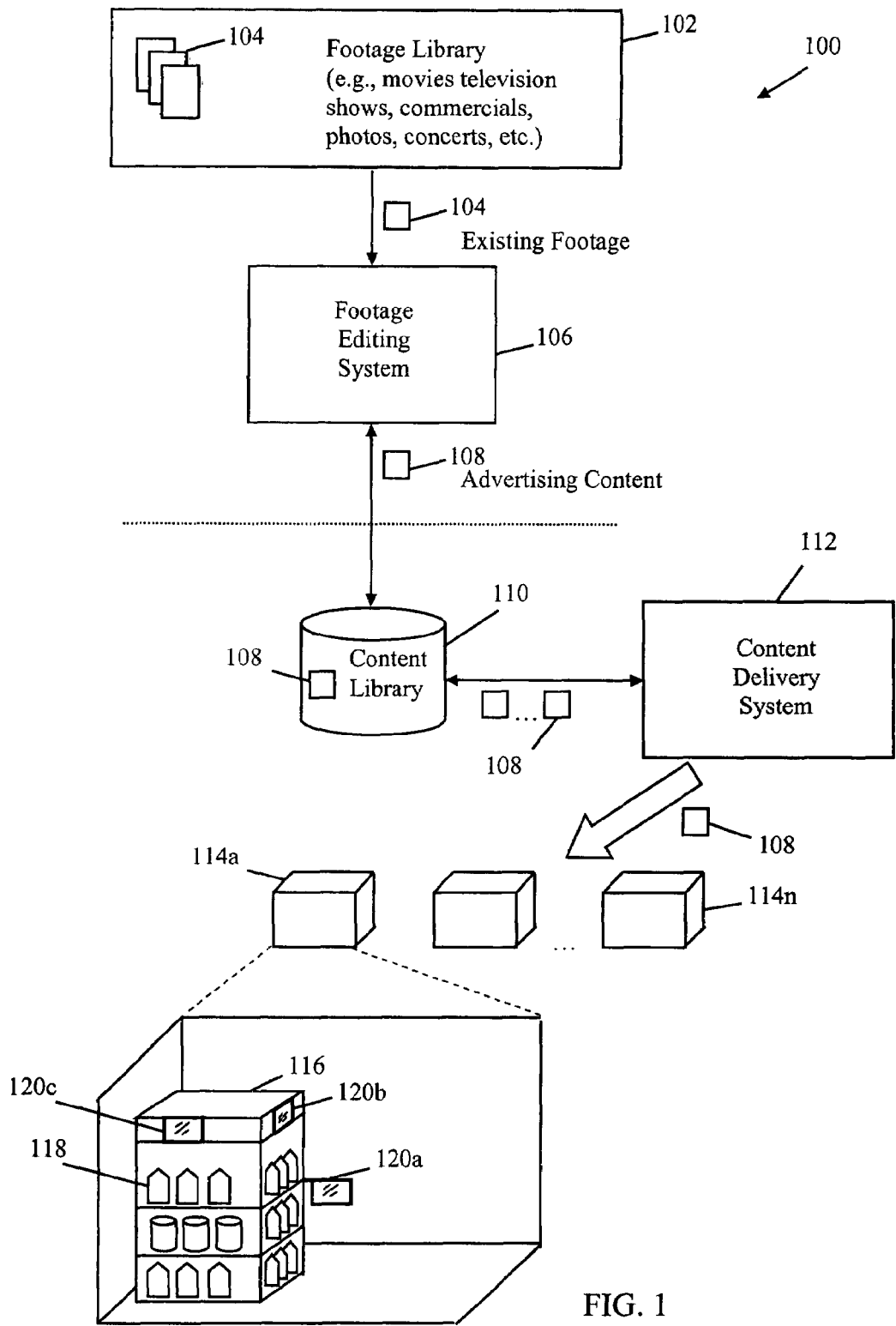
FIG. 1 is an exemplary system block diagram describing editing of footage and distributing and displaying of advertising content.

There is a vast amount of existing and archived visual media that has been generated for entertainment, advertising or news purposes, for example. The existing footage may include movies, television programs, television commercials, cartoons, music videos, concert recordings, sports broadcasts, etc. The existing footage may be edited to produce useful advertising content to be displayed to promote goods, services, entertainment, and programming viewership ("products") that may or may not be sold in a business establishment (e.g., retail store) to consumers or for promoting the business establishment itself. Of course, the more popular the existing footage, the more valuable segments of the footage become for creating advertising content.

Customers or shoppers for products at retail locations have a limited amount of time and attention span to watch advertising content for products being displayed. Because of the limited time to watch the electronic display devices, the existing footage may be edited to accommodate the shoppers' limited time. For example, a shopper may be willing to commit only 20-40 seconds at the beverage section of a store, but 2-3 minutes at the deli or seafood counter. Therefore, the existing footage may be edited appropriately in length based on the particular product(s) being promoted and location at the business establishments the footage is being seen.

Further, the editing process may produce snippets or clips that convey a complete, comprehensive message to the shopper or consumer. The advertising content may provide enough content of the existing footage so that the consumer can view a fraction of the complete footage (e.g., television show) to capture the highlights. While the advertising content may or may not contain references to particular products, entertainment value to attract consumers to a particular location within a retail location, such as a particular shelf, may be achieved. For example, portions of a comedian's monologue, soap opera highlights, or sporting events may be utilized as the advertising content. Still yet, the existing footage may be edited and distributed in such a way that multiple electronic display devices need to be viewed to complete the entire content. For example, movies that are part of a trilogy or have one or more sequels may be edited to form multiple advertisements and be displayed on sequential electronic display devices along an aisle, thereby enticing the shopper to spend a longer duration of time near one or more products without spending a long time at a single electronic display device.

Because of the advancement of digital editing technology, product placement into footage originally absent of the product may be performed so that advertising content displayed in association with the product at the retail location contains an image of the product included in the footage. For example, footage showing someone drinking from a wine glass may be edited such that the wine glass is replaced with a particular brand of soft drink and be displayed at a retail location. Alternatively, a still image or photograph may be integrated into and/or with the footage to produce the advertising content for display at or near a particular product on a store fixture. Because the principles of the present invention are utilized in conjunction with the system described in copending patent application Ser. No. 10/277,218, the advertising content may be distributed to electronic display devices at business establishment locations specific network addresses and/or identifiers designated by the business establishments or other network planner that may be disposed in relation to the particular products being edited into the footage. In another embodiment, the advertising content may be derived from the footage in such a way as to be more general or promotional in nature and be distributed to electronic display devices that are generally associated near the products (e.g., electronic display device hanging from a ceiling) or remotely located in relation to the products (e.g., electronic display device located at an entry way).

FIG. 1 is an exemplary block diagram of an editing and communications system 100 utilized to edit footage and distribute advertising content to out-of-home locations, including retail locations. The communications system 100 includes a footage library 102 that may have existing footage 104, such as movies, television shows, television commercials, photographs, concerts, etc. The footage library 102 may be a digital database or be composed of film, digital data, magnetic disk and/or other physical media containing the existing footage 104. Additionally, the footage library 102 may be established as a database as understood in the art.

The existing footage 104 may be input into a footage editing system 106. The footage editing system 106 may be a video editor capable of generating, combining, and/or manipulating images from the existing footage 104 or other images (e.g., product image) to be incorporated into the existing footage 104 as understood in the art. Resulting from the footage editing system 106 is advertising content 108 or derivative footage that may be communicated and stored in a content library 110, which may include a database, such as an object oriented database.

A content delivery system 112 or communications system as described in copending patent application Ser. No. 10/277, 218 may access the advertising content 108 stored in the content library 110 to communicate the advertising content 108 to business establishments 114a-114n (collectively 114). The content delivery system 112 alternatively may include the footage editing system 106 and advertising content library 110. While satellite communication delivery techniques provide economy of scale and bandwidth, other forms of delivering the advertising, including content 108 may be utilized in accordance with the principles of the present invention via more traditional techniques, such as via video tapes, compact disks, digital video disks (DVD), cassette tapes, Internet downloads, and modem downloads. A scheduling system (not shown) may be integrated into or be separate from the footage editing system 106 or content delivery system 112 and be operable to enable selection of time of delivery, electronic display location(s) for delivery, times for display, frequency of display, and other parameters associated with displaying the advertising content 108 in relation to a product at a business establishment 114. The business establishment 114a may include a fixture 116, which may be in the form of a display case, shelf system, or other structure operable to support or display products 118 being offered for sale. One or more electronic displays 120a-120c (collectively 120) may be coupled to fixture 116 for receiving and displaying the advertising content 108. In one embodiment, a local server (not shown) and local communication channel, such as a wireless local network (not shown), may be utilized within each business establishment 114 as described in copending patent application Ser. No. 10/277,218. Alternatively, one local server may be utilized to support multiple locations of a business establishment 114. Each electronic display 120 may be individually addressable and receive and display the same or different advertising content 108.

TABLE 1 is an exemplary playlist that may be utilized to locate advertising content 108 within the advertising content library 110 for delivery and play at selected electronic displays 120. As shown, there are three advertising content files (e.g., SODA_C725BL.MPG), which may be in the form of a movie file or MPEG file, scheduled to be displayed in specific retail chains, in certain locations of the county, at particular fixtures 116 or electronic displays 120, at certain times, and at certain frequencies. Other identifier, storage, distribution, and display information may be selected and maintained in the table for use by the out-of-home delivery system 112 in accordance with the principles of the present invention.

TABLE 1

Exemplary Playlist

| CONTENT INFORMATION | | | PLAY INFORMATION | | | | |
|---|---|---|---|---|---|---|---|
| ADVERTISING CONTENT | CREATION DATE | LENGTH (SECS) | STORES | LOCATIONS | FIXTURE/ ELECTRONIC DISPLAY | TIMES | FREQUENCY |
| SODA_C725BL.MPG | Jul. 14, 2003 | 0:12 | RETAIL CHAIN A | NE | A8 | 6 am- 8 pm | 30 secs |
| POPCORN_J974TB.MPG | Jun. 10, 2003 | 0:28 | RETAIL CHAINS A C L N | ALL | B4 172.16.1.93 POPCORN D3 | 5 pm- 11 pm | 56 secs |
| SHAVINGCREAM_N463RZ.MPG | Jun. 10, 2003 | 1:25 | RETAIL CHAINS A C N R | SW | G8 | 6 am- 10 am; 5 pm- 9 pm | 3 min |

Figure 2:
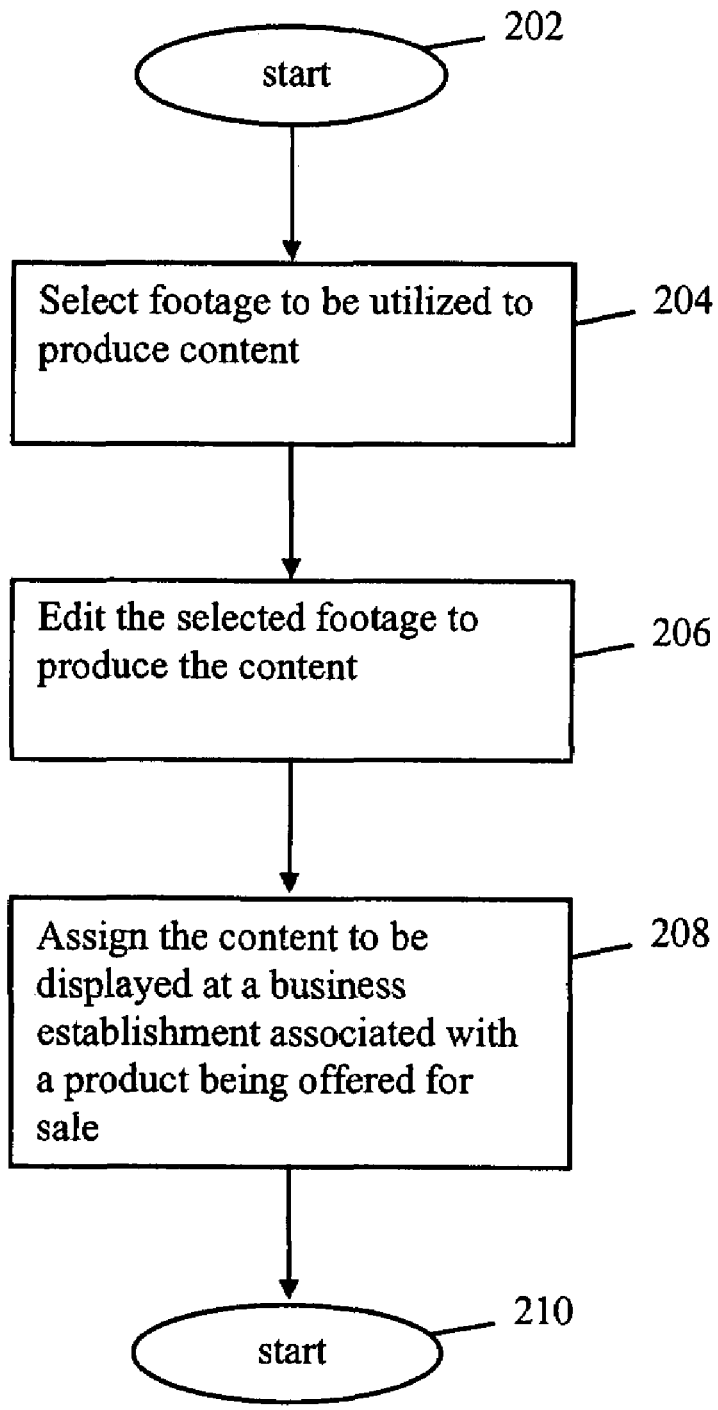
FIG. 2 is an exemplary flow diagram describing the editing, distributing, and displaying processes in accordance with FIG. 1.

FIG. 2 is an exemplary flow diagram 200 describing a process for producing and distributing content. The process starts at step 200. At step 204, footage is selected to be utilized to produce content. The selected footage, which may include video, motion, still images, and audio, for example, is edited to produce the content at step 206. At step 208, the content to be displayed at a business establishment in association with a product or service that may be offered for sale is assigned.

The selection process at step 204 may include identifying footage having images of the product contained therein. The editing process at step 206 may include adding an image of the product to the selected footage. The assigning process at step 208 may include selecting at least one business establishment, fixture, and/or electronic display, to display the advertising content. Additionally and/or alternatively, the assigning process at step 208 may include selecting a range of dates and times to display the content. Other selections in accordance with the principles of the present invention may be applied. In one embodiment, the business establishment may manage the content and distribution and display thereof. Alternatively, a third party may manage such operations. The process ends at step 210.

It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiments described, without departing from the inventive concepts. Consequently, the invention is to be construed as embracing each and every novel feature and novel combination of features present in and/or possessed by the principles of the present invention herein described.

What is claimed is:

1. A method for distributing content for display at a business establishment, comprising:
    establishing a playlist defining a sequence of video clips to be played by at least one electronic display;
    editing video footage not originally produced as an advertisement utilizing a video editing system, said editing including:
        providing the video footage not originally produced as an advertisement;
        modifying content of at least one frame of the video footage to include an image of a product in the at least one frame; and
        generating a first advertisement video clip including the edited video footage with the product image edited into the modified at least one frame of the video footage not originally produced as an advertisement, said editing and generating being performed prior to inserting an identifier that references the first advertisement video clip into the playlist;
    receiving at least one second advertisement video clip different from the first advertisement video clip at a content delivery system;
    inserting, by the content delivery system, identifiers that reference respective first and second advertisement video clips into the playlist; and
    distributing, by the content delivery system, the first and second advertisement video clips to at least one electronic display in accordance with the playlist identifying the advertisement video clips to be displayed at the business establishment.

2. The method according to claim 1, further comprising managing the playlist in response to receiving an updated playlist.

3. The method according to claim 1, further comprising displaying the first advertisement video clip in relation to the product being displayed for purchase at the business establishment.

4. The method according to claim 3, further comprising displaying the first advertisement video clip on an electronic display connected to a fixture supporting products at the business establishment.

5. The method according to claim 1, wherein generating a first advertisement video clip includes generating a first video clip having a length of 15 seconds or less, and wherein distributing the video clip includes distributing the first advertisement video clip to a retail store.

6. The method according to claim 1, further comprising displaying the first advertisement video clip including the image of the product near the product being displayed for purchase at the business location.

7. The method according to claim 6, further comprising positioning an electronic display near the product being displayed for purchase at the business location prior to displaying the first advertisement video clip.

8. The method according to claim 7, wherein positioning the electronic display includes positioning the electronic display within six feet of the product.

9. The method according to claim 1, further comprising accessing an identifier of the at least one electronic display in the playlist.

10. The method according to claim 1, further comprising accessing an identifier of the product that is displayed in the first advertisement video clip.

11. The method according to claim 1, wherein modifying the content of the at least one frame of the video footage includes positioning the product image over another object being the same size or smaller as originally displayed in the video footage, thereby producing edited video footage that displays the product image and not the other object.

12. The method according to claim 11, wherein positioning the product image over another object includes positioning the product image over the object the entire time the object would be displayed during the first video clip.

13. The method according to claim 12, wherein positioning the product image over the object includes moving the product image to maintain overlaying the product image over the object.

14. The method according to claim 1, where the first and second advertisement video clips are the same length.

* * * * *